UNITED STATES PATENT OFFICE.

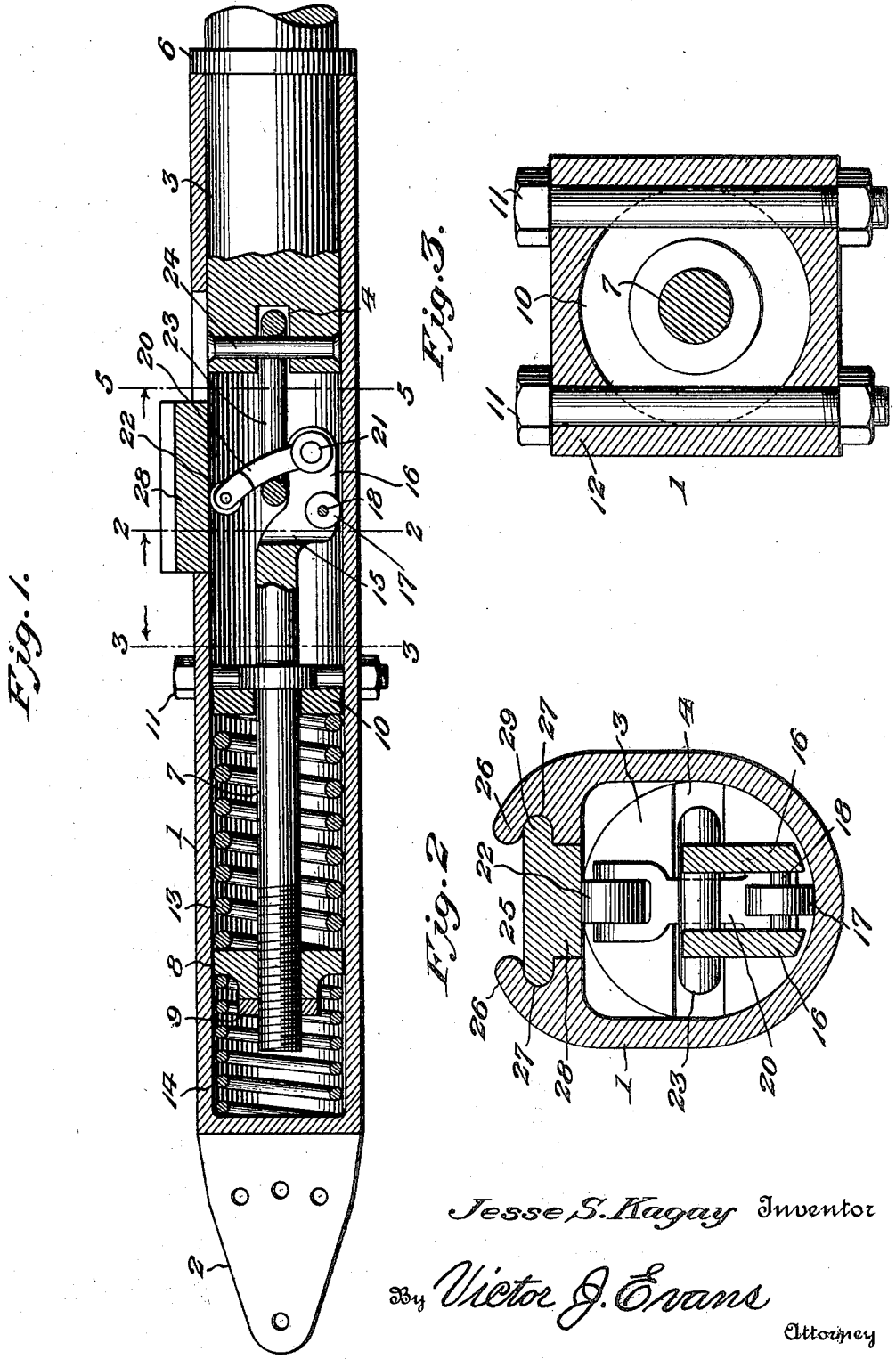

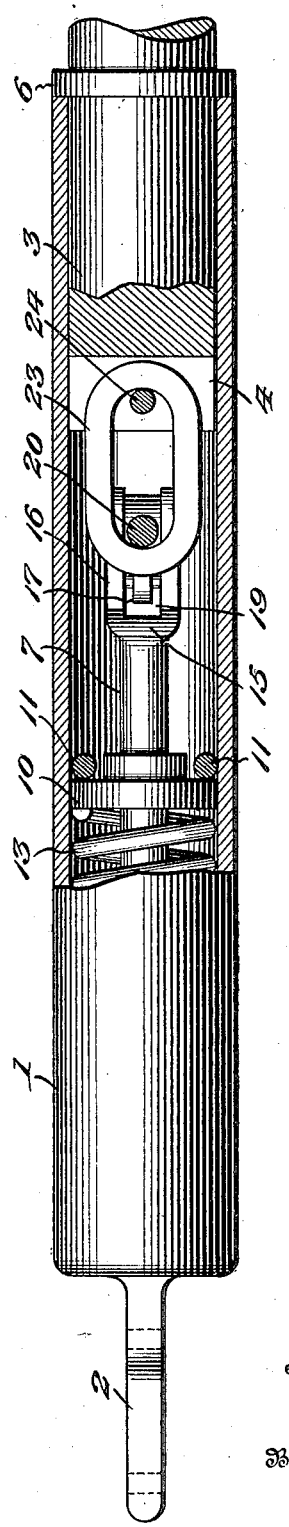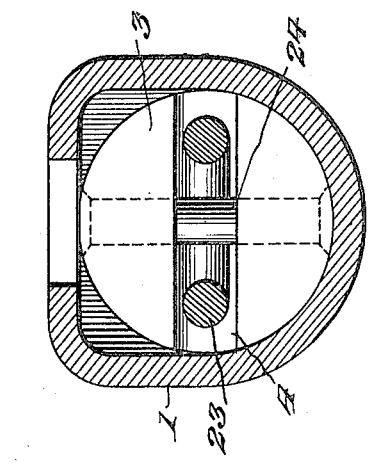

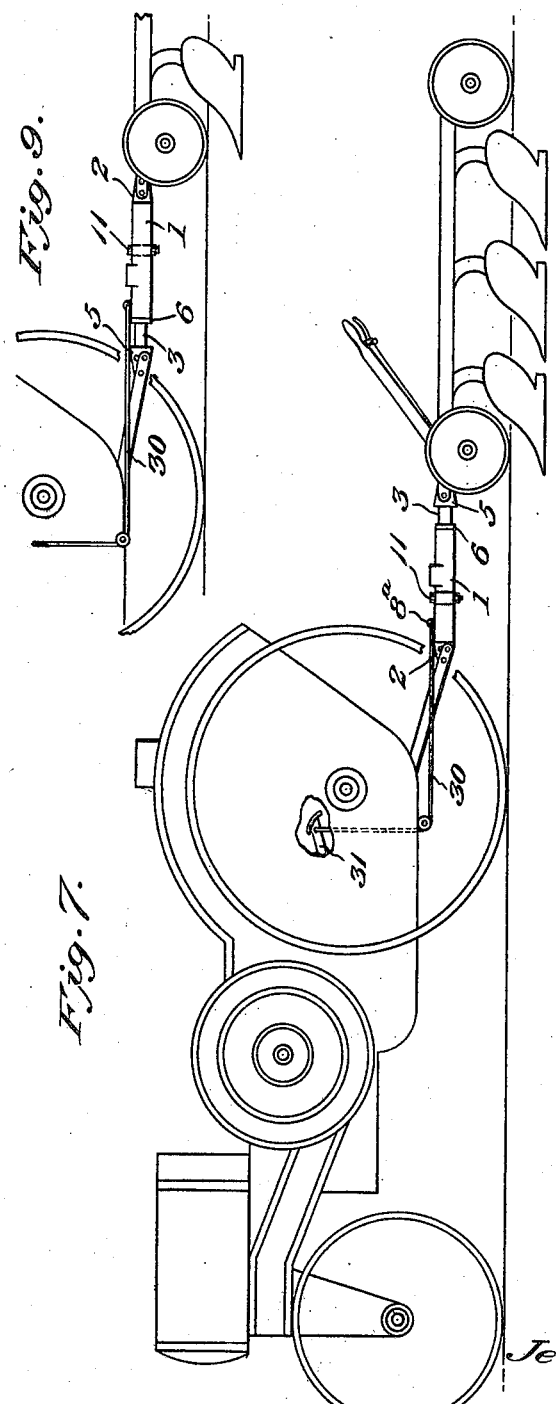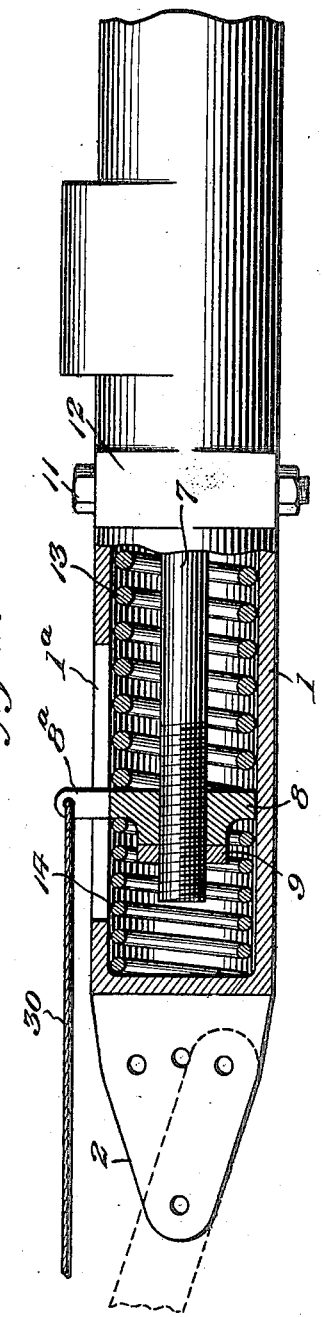

JESSE S. KAGAY, OF RICHWOOD, OHIO.

TRIP-HITCH AND SHOCK-ABSORBER.

1,323,634.  Specification of Letters Patent.  Patented Dec. 2, 1919.

Application filed July 13, 1918. Serial No. 244,814.

*To all whom it may concern:*

Be it known that I, JESSE S. KAGAY, a citizen of the United States, residing at Richwood, in the county of Union and State of Ohio, have invented new and useful Improvements in Trip-Hitch and Shock-Absorbers, of which the following is a specification.

This invention is an improved trip hitch and shock absorber especially adapted for use in connection with a tractor and a plow or other machine drawn by the tractor, to absorb draft shocks and to also release the plow or machine and prevent breakage in the event that the same should strike a stump, root, stone or other like obstruction.

The object of the invention is to provide an improved hitch of this character which is simple in construction and is reliable in operation and which can be adjusted to operate at any desired tension.

Another object of the invention is to combine with the trip hitch means to automatically throw the tractor out of gear in the event that the plow or other machine is caught by an obstruction and thereby not only release the plow but also stop the operation of the tractor.

With the above and other objects in view, the invention consists in the construction, combination and arrangement of devices hereinafter described and claimed.

In the accompanying drawings:

Figure 1 is a longitudinal sectional view of a trip hitch and shock absorber constructed and arranged in accordance with my invention.

Fig. 2 is a transverse sectional view of the same on the plane indicated by the line 2—2 of Fig. 1.

Fig. 3 is a similar view on the plane indicated by the line 3—3 of Fig. 1.

Fig. 4 is a plan of the same, partly in section.

Fig. 5 is a transverse sectional view of the same on the plane indicated by the line 5—5 of Fig. 1.

Fig. 6 is a detail sectional view showing the hitch in the act of releasing the draft link.

Fig. 7 is a diagrammatic elevation, showing the trip hitch and shock absorber in connection with a plow and a tractor and connected with the gear lever of the tractor to actuate the same and throw the tractor out of gear in the event that the plow should strike an obstruction.

Fig. 8 is a detail sectional view of the same, as thus modified.

Fig. 9 is a diagrammatic elevation showing the trip hitch and shock absorber in connection with a plow and tractor and connected directly to the plow.

In the embodiment of my invention, I provide a cylinder 1 which is open at one end and is provided at the other end with a clevis 2 for attachment to the beam or frame of a plow or other machine to be drawn by a tractor. A cylindrical draw bar 3 is arranged for longitudinal movement in and for detachment from the open end of the cylinder and is provided at its inner end with a recess 4 and at its outer end with a clevis 5 for attachment to a tractor and is also provided with an annular circumferential flange 6 which forms a stop element to engage the open end of the cylinder and limit the extent of rearward movement of the draw bar in the cylinder.

A rod 7 is arranged for longitudinal movement in the cylinder and is provided near the rear end with a plunger 8 which is held by a nut 9, the rear end of the rod being threaded to receive the nut. A stop disk 10 is also arranged in the cylinder, has an opening through which the rod 7 slidably passes and said stop disk is held by a pair of bolts 11 which pass through a squared portion 12 with which the cylinder is provided, the stop disk being on the rear side of the bolts. A draft resisting spring 13, which is here shown as a coiled extensile spring is arranged in the cylinder between the plunger 8 and the stop disk 10. In the rear end of the cylinder is a cushioning or rebound ring 14 which is lighter and of less strength than the spring 13 and which bears against the rear side of the plunger. At its front end the rod 7 is provided with an elbow or bend 15 and with a forwardly extending arm 16 which is cranked or arranged eccentrically with respect to the rod. Said arm has an anti-friction roller 17 mounted therein as at 18, the said roller bearing against the wall of the cylinder. The said arm is forked or bifurcated as at 19, the said roller being arranged therein and a trigger 20 being also arranged with one end pivotally mounted as at 21 in said bifurcated arm of said rod. The free end of the trigger is provided with an antifriction roller 22 which bears against the wall of the bore of the cylinder on the side opposite the roller 17. A link 23, is pivotally mounted at one end in the recess 4 of the draw bar 3 by a bolt or pin 24 and is engaged at the opposite end by the trigger 20, which passes therethrough, so that the link serves to connect the draw bar and the rod 7.

The cylinder is provided at a suitable distance from its front end with a slot 25 and also with flange walls 26 on opposite sides of the rear portion of said slot, said flange walls being provided with grooves 27 in their opposing sides. A lid 28 closes the said rear portion of the slot and serves as a bearing against which the roller 22 operates, the lid having a widened head 29, the sides of which engage in the grooves 27 as shown.

While the trip hitch is in use under ordinary conditions the tension of the spring 13 holds the rod 7 at or near the rearward limit of its movement, so that the trigger is held by the lid 28 which in effect forms a portion of one side of the cylinder in the required position, transversely of the cylinder, to keep the link 23 connected to the rod 7. Draft shocks are absorbed by the spring 13 which permits limited yieldable movement of the rod 7. In the event that the plow or other machine which is being drawn by the tractor should strike a root, stump, stone or other obstruction, the spring 13 will yield sufficiently to permit the rod 7 and the trigger 20 to move forwardly in the cylinder to such an extent as to cause the roller 22 at the free end of the trigger to move past the front end of the lid and into the front portion of the slot 25 and the length of such slot is such that the trigger will turn on its pivot to a position parallel with the rod 7 and release the link 23, thus enabling the draw bar 3 to be drawn entirely out of the cylinder and completely disconnecting the tractor from the plow and thereby preventing injury to the plow or other machine. The tension of the spring 13 may be varied by appropriately adjusting the plunger 8 on the rod 7 by means of the nut 9. The spring 14 arrests the plunger 8 on the rebound.

In Figs. 7 and 8, I show a modification of my invention in which the plunger 8 is provided with an attaching member 8ª which projects therefrom and operates in a slot 1ª with which the cylinder is provided. A cord 30 which, in practice, may be a wire cable of suitable length and size has one end attached to said attaching member. The cable is then passed through a pulley under the rear axle of the tractor and is attached to the clutch pedal or lever 31 of the tractor and is properly adjusted so that should the plow strike an obstruction and the hitch release the plow from the tractor, the cable will operate the lever and thereby cause the tractor to be drawn out of gear so that the hitch will not only release the plow from the tractor but will also stop the tractor. The stop member 6 of the draw bar permits the tractor to be reversed and to back the plow or other machine when desired.

While I have herein shown and described, a preferred embodiment of my invention, I would have it understood that changes may be made in the form, proportion and construction of the several parts without departing from the spirit of my invention and within the scope of the appended claims.

Having thus described my invention, I claim:

1. A trip hitch of the class described comprising a cylinder, a draw bar arranged for longitudinal movement in one end of the cylinder, a rod arranged for longitudinal movement in the cylinder, a spring acting to normally hold the rod against the draft stress, a trigger pivotally connected to the rod and normally engaging one side of the cylinder, and a link connected to the draw bar and normally engaged by the trigger, the trigger being released from engagement with the cylinder when the rod is drawn forwardly to a predetermined extent and thereby releasing the link.

2. A trip hitch of the class described, comprising a cylinder, a draw bar arranged for longitudinal movement in one end of the cylinder, a rod arranged for longitudinal movement in the cylinder, a spring acting to normally hold the rod against the draft stress, a trigger pivotally connected to the rod and normally engaging one side of the cylinder, a link connected to the draw bar and normally engaged by the trigger, the trigger being released from engagement with the cylinder when the rod is drawn forwardly to a predetermined extent and thereby releasing the link, and a cushioning spring in the rear end of the cylinder, said rod having a plunger engaging said cushioning ring, said plunger being longitudinally adjustable on said rod to vary the tension of the first named spring.

3. A trip hitch of the class described comprising a cylinder open at one end and having a slot in one side, a draw bar arranged for longitudinal movement in the open end of the cylinder, a rod arranged for longitudinal movement in the cylinder, a spring acting to normally hold the rod in the cylinder, a trigger pivotally connected to the rod, normally bearing against one side of the cylinder and movable with the rod to said slot, and a link attached to the draw bar and normally held by the trigger, said trigger turning on its pivot and serving to release the link when the free end of the trigger reaches said slot.

4. A trip hitch of the class described comprising a cylinder open at one end and having a slot in one side, a draw bar arranged for longitudinal movement in the open end of the cylinder, a rod arranged for longitudinal movement in the cylinder, a spring acting to normally hold the rod in the cylinder, a trigger pivotally connected to the rod, normally bearing against one side of the cylinder and movable with the rod to said slot, a link attached to the draw bar and normally held by the trigger, said trigger turning on its pivot and serving to release the link when the free end of the trigger reaches said slot, and a lid arranged in and closing the inner end of said slot and presenting a surface on which the free end of the trigger normally operates.

5. A trip hitch of the class described comprising a cylinder, a rod arranged for longitudinal movement in the cylinder, a stop disk in the cylinder and through which the rod passes, means to detachably secure the stop disk with the cylinder, a plunger on the rod, a coil extensile spring arranged around the rod and between the plunger and the stop disk, a trigger pivotally connected to the outer end of the rod and normally engaging one side of the cylinder, said cylinder having a slot to clear the trigger when the latter reaches a predetermined position, a draw bar arranged for longitudinal movement in one end of the cylinder and a link connected to the draw bar and normally engaged by the trigger.

In testimony whereof I affix my signature.

JESSE S. KAGAY.